(12) United States Patent
Sn et al.

(10) Patent No.: US 11,743,106 B2
(45) Date of Patent: Aug. 29, 2023

(54) RAPID APPRAISAL OF NIC STATUS FOR HIGH-AVAILABILITY SERVERS

(71) Applicant: Dell Products L.P., Round Rock, TX (US)

(72) Inventors: Faizal Sn, Bangalore (IN); Srihari Srirangam, Khammam (IN); Bharath Koushik Bangalore Suryanarayana, Bangalore (IN); Rajib Saha, Bangalore (IN); Prince Kumar, Bangalore (IN); Jitendra Rath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/497,592

(22) Filed: Oct. 8, 2021

(65) Prior Publication Data
US 2023/0112143 A1    Apr. 13, 2023

(51) Int. Cl.
*H04L 41/0604* (2022.01)
*H04L 43/0817* (2022.01)
*H04L 41/0654* (2022.01)

(52) U.S. Cl.
CPC ...... *H04L 41/0613* (2013.01); *H04L 41/0654* (2013.01); *H04L 43/0817* (2013.01)

(58) Field of Classification Search
CPC ............. H04L 41/0613; H04L 41/0654; H04L 43/0817
USPC ........................................................ 709/224
See application file for complete search history.

(56) References Cited

U.S. PATENT DOCUMENTS

| | | | |
|---|---|---|---|
| 6,208,616 B1* | 3/2001 | Mahalingam | G06F 11/1482 370/254 |
| 8,134,928 B1* | 3/2012 | Manickavasagam | H04L 41/0677 370/242 |
| 11,070,541 B2 | 7/2021 | Liu et al. | |
| 2004/0236991 A1* | 11/2004 | Brundridge | H04L 1/24 714/25 |
| 2009/0249120 A1* | 10/2009 | Yao | G06F 11/1417 714/15 |
| 2011/0128970 A1* | 6/2011 | Breton | H04L 45/18 370/463 |
| 2011/0317020 A1* | 12/2011 | Medina | H04N 17/004 348/192 |
| 2013/0179732 A1* | 7/2013 | Alanis | G06F 11/22 714/E11.147 |
| 2015/0109903 A1* | 4/2015 | Nasir | H04L 41/0668 370/221 |

(Continued)

*Primary Examiner* — Meng Vang
(74) *Attorney, Agent, or Firm* — Larson Newman, LLP

(57) ABSTRACT

An information handling system includes a network interface device configured to provide indications of faults on the network interface device, a baseboard management controller agent configured to receive the indications, and a baseboard management controller coupled to a management system. The management system mitigates the faults on the network interface device. The network interface device further detects a fault on the network interface device and provides an indication to the baseboard management controller agent in response to detecting the fault. The baseboard management controller agent further receives the indication from the network interface device, receives an identification of the management system from the baseboard management controller, and provides a second indication to the management system based upon the identification.

20 Claims, 5 Drawing Sheets

(56) References Cited

U.S. PATENT DOCUMENTS

2015/0319034 A1* 11/2015 Zourzouvillys ..... H04L 41/0663
　　　　　　　　　　　　　　　　　　　　370/228
2020/0396298 A1　12/2020 Livanos et al.

* cited by examiner

US 11,743,106 B2

RAPID APPRAISAL OF NIC STATUS FOR HIGH-AVAILABILITY SERVERS

FIELD OF THE DISCLOSURE

This disclosure generally relates to information handling systems, and more particularly relates to providing rapid appraisal of network interface card (NIC) status for a high-availability server.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a network interface device configured to provide indications of faults on the network interface device, a baseboard management controller agent configured to receive the indications, and a baseboard management controller coupled to a management system. The management system may mitigate the faults on the network interface device. The network interface device may further detect a fault on the network interface device and provide an indication to the baseboard management controller agent in response to detecting the fault. The baseboard management controller agent may further receive the indication from the network interface device, receive an identification of the management system from the baseboard management controller, and provide a second indication to the management system based upon the identification

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
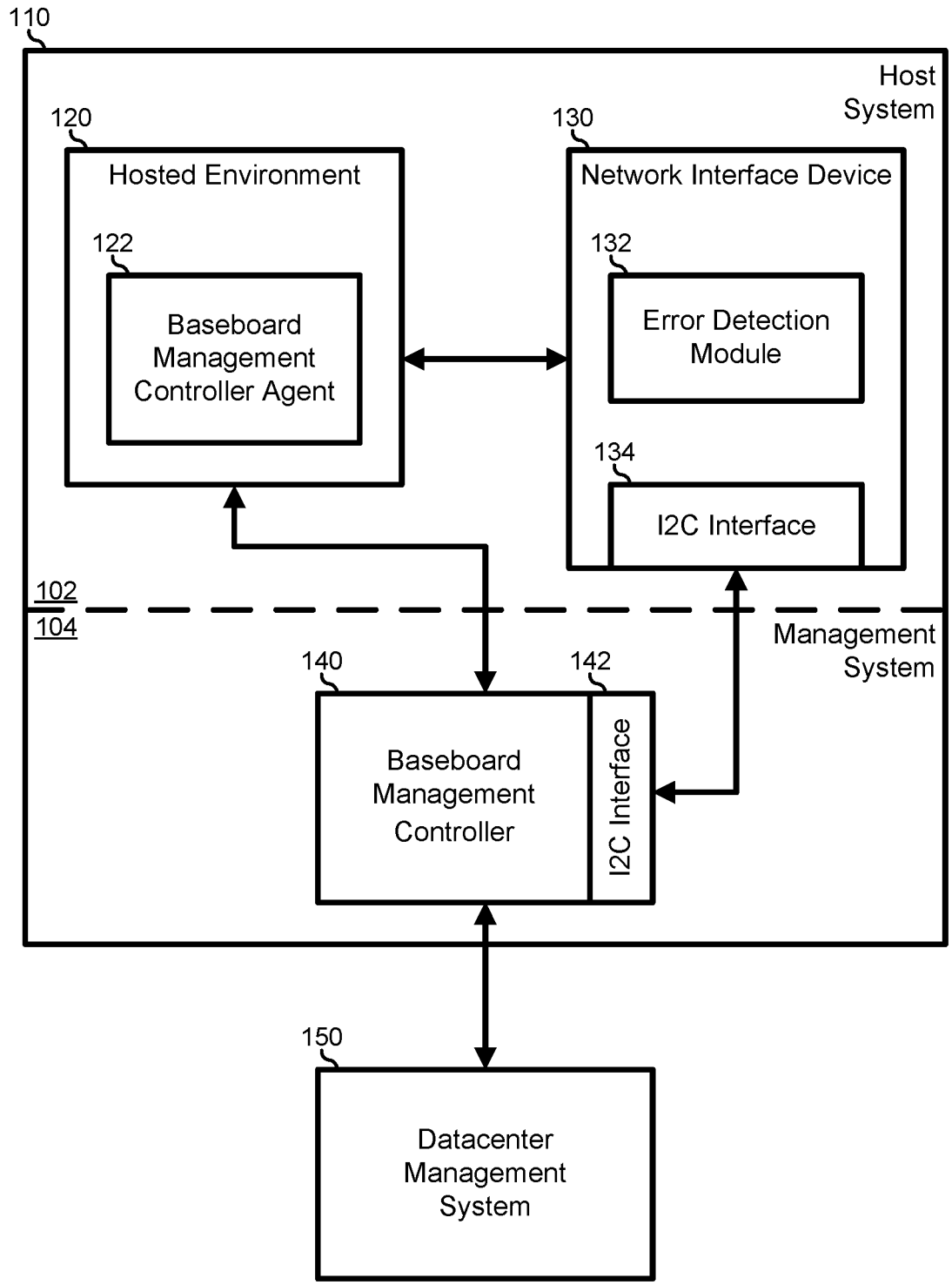
FIG. 1 is a block diagram illustrating an information handling system according to an embodiment of the current disclosure.

FIG. 1 illustrates a datacenter 100 including an information handling system 100 and a datacenter management system 150. Information handling system 110 represents a processing system of datacenter 100 that operates to provide the data processing, communication, storage, or other functions and features of the datacenter. Information handling system 110 includes a hosted system 102 and a management system 104. Hosted environment 102 represents the hardware, software, firmware, and other elements typically associated with the performance of the data processing, communication, storage, and other functions and features of information handling system 100, and may include hardware elements like processors, input/output hubs, short-term and long-term memory storage devices, interface devices, and other hardware elements, code elements like a Basic Input/Output System (BIOS)/Universal Extensible Firmware Interface (UEFI), device firmware and drivers, an Operating System (OS), a Virtual Machine Manager (VMM), or other code elements, as needed or desired.

Host system 102 includes a hosted environment 120, and a network interface device 130. Hosted environment 120 represents the operating environment instantiated on host system 102, and may include the system BIOS/UEFI, an OS or VMM, and the application software launched to perform the data processing, communication, storage, and other functions and features of information handling system 100. Hosted environment 120 includes a Baseboard Management Controller (BMC) agent 122, as described further below. Network interface device 130 represent a device that operates to provide one or more communication interface between hosted environment 120 and other elements of datacenter 100. Network interface device 130 may thus operate in conformance with one or more network communication standards, such as an Ethernet standard, a Fiber-Channel standard, or other proprietary network communication standards, as needed or desired. In particular, network interface device 130 represents a single-point network node, such as a Network Interface Card (NIC), or may represent a virtualizable network node, such as a Host Bus Adapter (HBA) that operates to communicate multiple virtual data flows via a single hardware network connection, as needed or desired. Network interface device 130 is connected to hosted environment 120 by a high-speed data communication interface, such as a Peripheral Component Interconnect-Express (PCIe) interface, such as a four-lane (x4) PCIe link, an eight-lane (x8) PCIe link, a 16-lane (x16) PCIe link, or the like. Network interface 130 includes an error detection module 132 and an Inter-Integrated Circuit (I2C) interface 134, as described further below.

Management system 104 represents hardware, software, firmware, and other elements that are provided not for the performance of the data processing, communication, storage, and other functions and features of information handling system 100, but for the monitoring, management, and maintenance of the operational state of the information handling system. As such, management system 104 offloads the monitoring, management, and maintenance functions to an out-of-band processor, thereby freeing up the processing elements of host system 102 to perform the represents the hardware, software, firmware, and other elements typically associated with the performance of the data processing, communication, storage, and other functions and features. Management system 104 includes a BMC 140 that provides the processing capability of the management system, and may include other elements, such as short-term and long-term data storage devices, firmware element, or the like, as needed or desired. BMC 140 includes an I2C interface 142 that is connected to I2C interface 134. While network interface device 130 and BMC 140 are illustrated as being connected via respective I2C interfaces 134 and 142, it will be understood that the network interface device and the BMC may be coupled via other interfaces in place of the I2C interfaces, or in addition to the I2C interfaces.

Error detection module 132 operates to detect error conditions on network interface device 130. In particular, error detection module 132 operates to detect hardware fault conditions on network interface device 130, such as receive errors, cyclic redundancy check (CRC) errors, error counts exceeding a threshold, transmit or receive buffer overflow, or the like. Additionally, where network interface device 130 supports virtual networking, error detection module 132 operates to detect errors on virtual network ports instantiated on the network interface device. Particularly where information handling system 100 represents a Virtual Network Function (VNF) server, various virtual machines instantiated on the information handling system may each have a virtualized network port instantiated on network interface device 130 for the provision of various telecom call/data and security services. In this case, information handling system 100 may be particularly sensitive to interruptions in network traffic because disruptions in network interface device 130 may affect customer service levels and lead to substantial revenue loss for the datacenter operator.

Datacenter management system 150 operates to monitor the status of network interface device 130, and to reassign redundant VNF servers and virtual network ports in the event of a hardware failure or virtual network port failure on the network interface device. In particular, datacenter management system 150 may operate to set up an information handling system similar to information handling system 110 as a failover VNF in the event of a catastrophic failure of information handling system 110. Here, the redundant information handling system can be preprogrammed with a mirror of hosted environment 120 and with virtual network port established on the network interface of the redundant information handling system. Then, a failure on information handling system 110 can be rapidly mitigated by reprogramming network traffic destined for information handling system 110 to the redundant information handling system, and by launching the requisite applications on the redundant information handling system.

Datacenter management system 150 may further set up a redundant network interface device similar to network interface device 130 within information handling system 110 such that the failure of network interface device 130 can be rapidly handled within the information handling system. Here, the redundant network interface can be preprogrammed with copies of the virtual network ports that are instantiated on network interface device 130. Then, a failure on network interface device 130 can be rapidly mitigated within information handling system 110 by reprogramming network traffic destined for network interfaced device 130 to the redundant network interface device, and redirecting the internal data traffic from network interface device 130 to the redundant network interface device. Further, datacenter management system 150 may set up redundant virtual network ports within network interface device 130, such that the failure of any particular virtual network port can be rapidly handled within the network interface device without having to reprogram the network traffic or change the internal data routings within information handling system 110.

In a typical VNF server, the BMC operates to receive indications of hardware errors on the installed network interface devices via the I2C interface. It will be understood that the I2C interface is a low bandwidth, two-wire interface that relies on an I2C master, typically in the BMC, to poll the various I2C slave devices to obtain status information. The inventors of the current disclosure have understood that, particularly as the use number of monitored devices within an information handling system increases, the time needed by a BMC to poll all of the devices to receive status updates has increased significantly. In particular, it may take between eight and ten (8-10) seconds between a first polling of a particular device to receive its status, and a next polling of that same device. As such, a failure that affects the network performance of the typical VNF server may not be detected until substantial down-time has been experienced on the network. Further, the typical information received by the BMC from a network interface device about a failure is limited to information about hardware failures, and not about failures of the virtual network ports instantiated on the network interface device. Such virtual network port failures are typically reported by the network interface device to a network interface device driver instantiated on the hosted environment of the information handling system, and are handled by the BIOS/UEFI or OS. Thus a significant number of failure modes may not even be detectable until such failures have had significant impact on the network traffic associated with the virtual network ports.

In a particular embodiment, BMC agent 122 operates to monitor error detection module 132 to determine the existence of a fault or failure on network interface device 130, and to provide fault information to BMC 140 based upon the determination. In a particular embodiment, BMC agent 122 sets a trap with the network interface device driver, such that, when the network interface driver receives a fault indication from network interface device 130, the network interface device driver provides an indication to BMC agent 122 of the fault. Here, BMC agent 122 is immediately informed of the presence of a fault, and BMC 140 much more rapidly provides the fault indication to datacenter management system 150, giving the datacenter management system more time to remedy the fault as described above. In another embodiment, BMC agent 122 polls the network interface device driver to determine the presence of a fault on network interface device 130. Here, the polling rate can be set to a much higher frequency than the I2C polling done by BMC 140 over I2C interface 142. Moreover, in either embodiment, the information provided to BMC 140 by BMC agent 122 includes information related to virtual network port faults, and so the BMC is provided with much richer information in a more timely manner.

Figure 2:
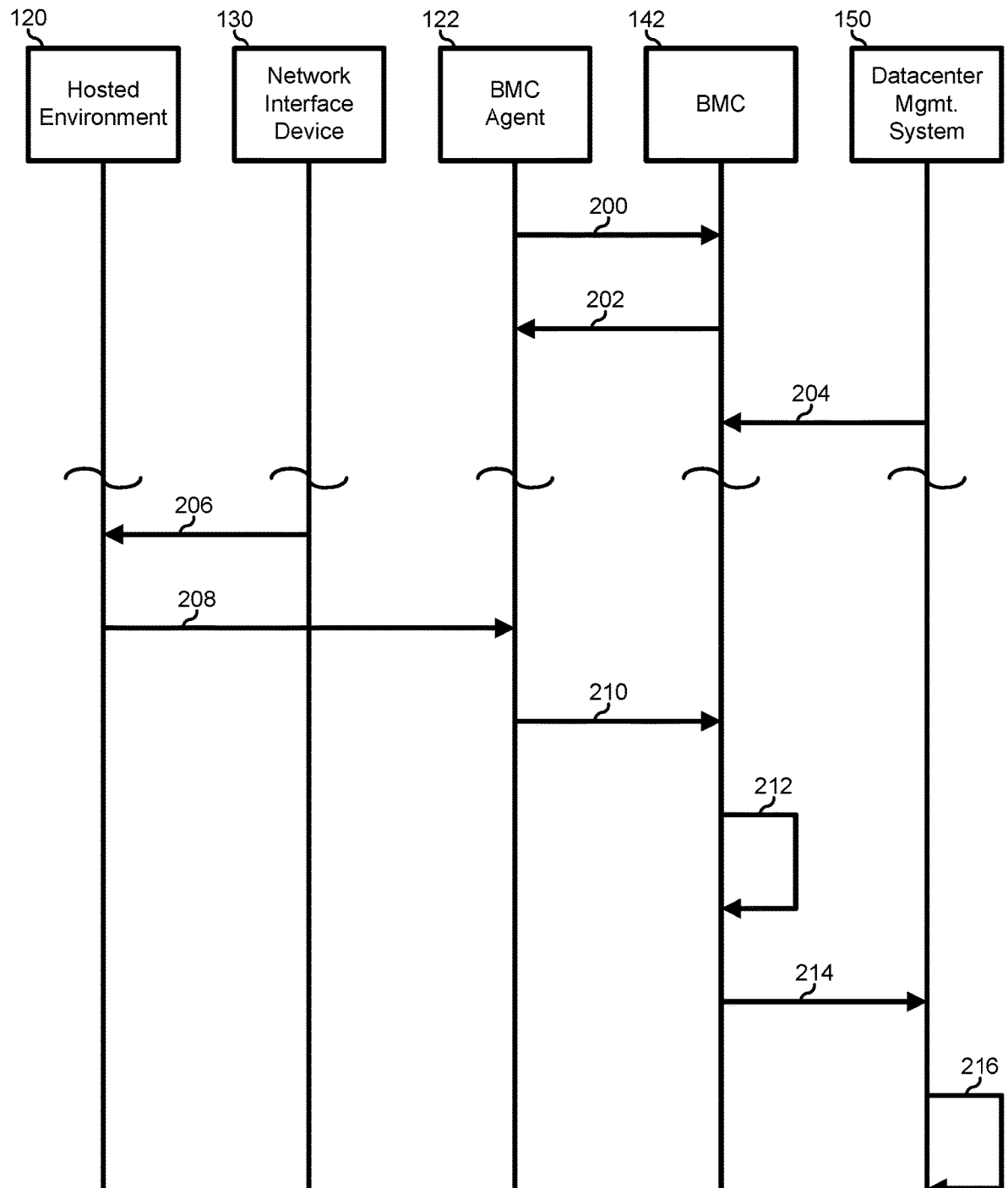
FIG. 2 is a flow diagram illustrating a method for providing rapid appraisal of network interface device failures for the information handling system of FIG. 1 according to an embodiment of the current disclosure.

FIG. 2 illustrates a method for providing rapid appraisal of failures on network interface device 130. In a setup phase, BMC agent 122 registers with BMC 140, establishing that the BMC agent will detect network interface device faults in step 200, and the BMC acknowledges the BMC agent in step 202. Datacenter management system 150 registers with BMC 140, establishing the datacenter management system as the agent responsible for responding to network interface device faults in step 204. This concludes the setup phase, and a runtime phase commences with the passage of time until a fault is detected by error detection module 132 on network interface device 130.

When a fault is detected, network interface device 130 provides the fault information to hosted environment 120 in step 206. Here, the fault information may be provided to a network interface device driver, as needed or desired. Hosted environment 120 provides the fault information to BMC agent 122 in step 208. Here, the fault information may be provided to BMC agent 122 via a trap or in response to polling by the BMC agent, as described above. In another embodiment, not illustrated, network interface device 130 provides the fault information directly to BMC agent 130, as needed or desired. BMC agent 122 logs the fault information to BMC 140 in step 210. Here, BMC agent 122 may provide the fault information to a lifecycle controller or another memory device of management system 102, as needed or desired.

Upon receipt of the fault information, BMC 140 forms a fault message for datacenter management system 150 in step 212. In a particular embodiment, the fault message is formatted as a Simple Network Management Protocol (SNMP) Protocol Data Unit (PDU), or as another management message format, as needed or desired. The fault message is provided by BMC 140 to datacenter management system 150 in step 214, and the datacenter management system mitigates the fault on network interface device 130 as described above, in step 216.

Figure 3:
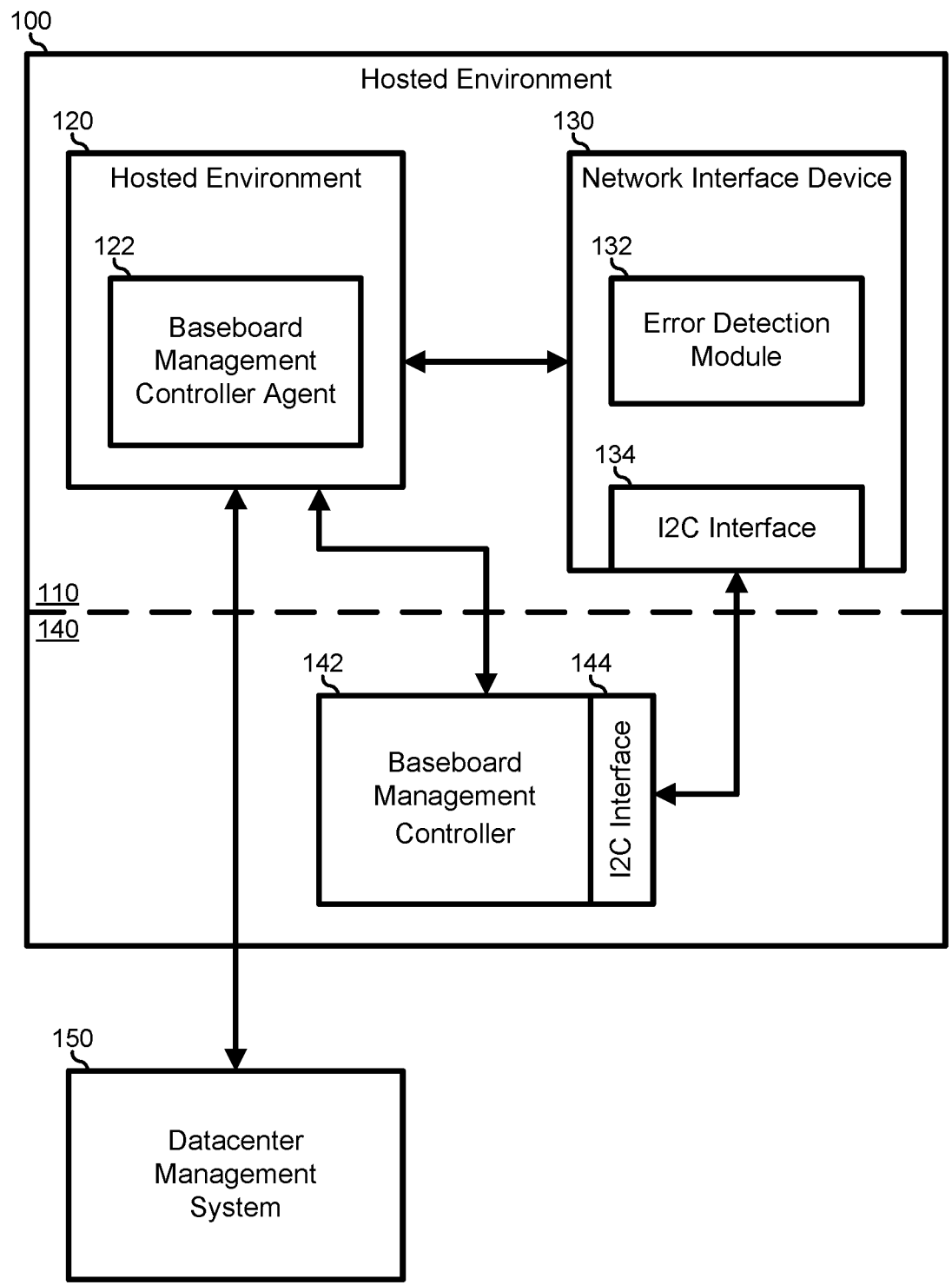
FIG. 3 is a block diagram of the information handling system of FIG. 1 according to another embodiment of the current disclosure.

FIG. 3 illustrates datacenter 100 according to another embodiment, where, in addition to the functions and features as described above, hosted environment 120 is connected to datacenter management system 150. In this embodiment, BMC agent 122 monitors error detection module 132 to determine the existence of a fault or failure on network interface device 130, and to provide fault information to BMC 140 based upon the determination, as described above. However, here, when BMC agent 122 receives the fault information, the BMC agent formats a message directly to datacenter management system 150 without first traversing BMC 142. Here, it will be understood that BMC agent 122 may still provide the fault information to BMC 140, as needed or desired. However, in this case, BMC 140 may utilize the fault information for management of information handling system 110, and not for correcting the fault.

Figure 4:
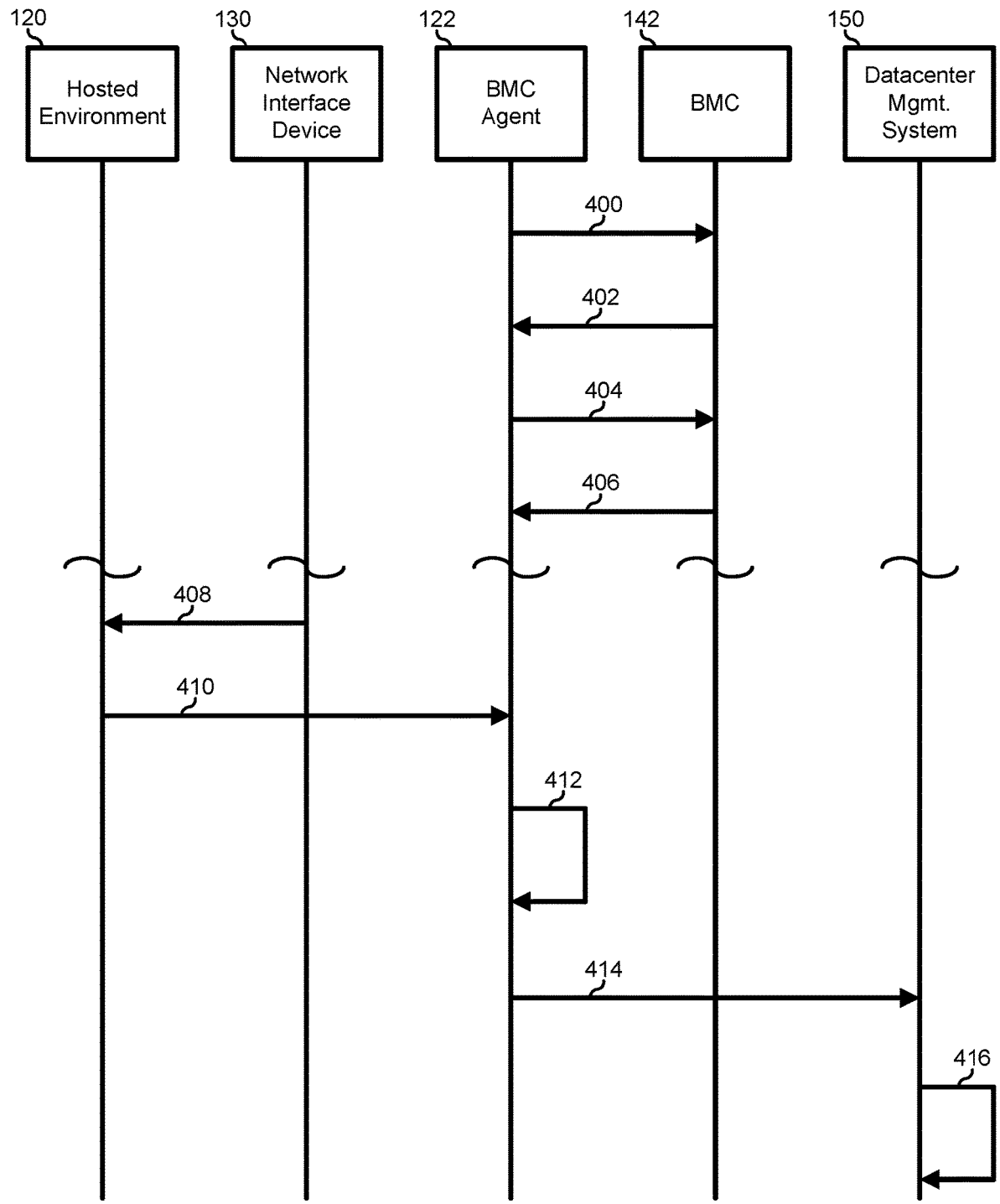
FIG. 4 is a flow diagram illustrating a method for providing rapid appraisal of network interface device failures for the information handling system of FIG. 3 according to another embodiment of the current disclosure.

FIG. 4 illustrates a method for providing rapid appraisal of failures on network interface device 130. In a setup phase, BMC agent 122 registers with BMC 140, establishing that the BMC agent will detect network interface device faults in step 400, and the BMC acknowledges the BMC agent in step 402. BMC agent 122 then requests for information identifying the agent identified for handling network interface device faults (i.e., datacenter management system 150) in step 404, and receives the identifying information in step 406. This concludes the setup phase, and a runtime phase commences with the passage of time until a fault is detected by error detection module 132 on network interface device 130. In another embodiment, not illustrated, step 404 (requesting the identifying information) and step 406 (receiving the identifying information) may be performed after the setup phase in response to the detection of a network interface device fault.

When a fault is detected, network interface device 130 provides the fault information to hosted environment 120 in step 408. Here, the fault information may be provided to a network interface device driver, as needed or desired. Hosted environment 120 provides the fault information to BMC agent 122 in step 410. Here, the fault information may be provided to BMC agent 122 via a trap or in response to polling by the BMC agent, as described above. In another embodiment, not illustrated, network interface device 130 provides the fault information directly to BMC agent 130, as needed or desired. Here, upon receipt of the fault information, BMC agent 122 forms a fault message for datacenter management system 150 in step 412. As described above, the fault message is formatted as a SNMP PDU, or as another management message format, as needed or desired. The fault message is provided by BMC agent 122 to datacenter management system 150 in step 414, and the datacenter management system mitigates the fault on network interface device 130 as described above, in step 416.

Figure 5:
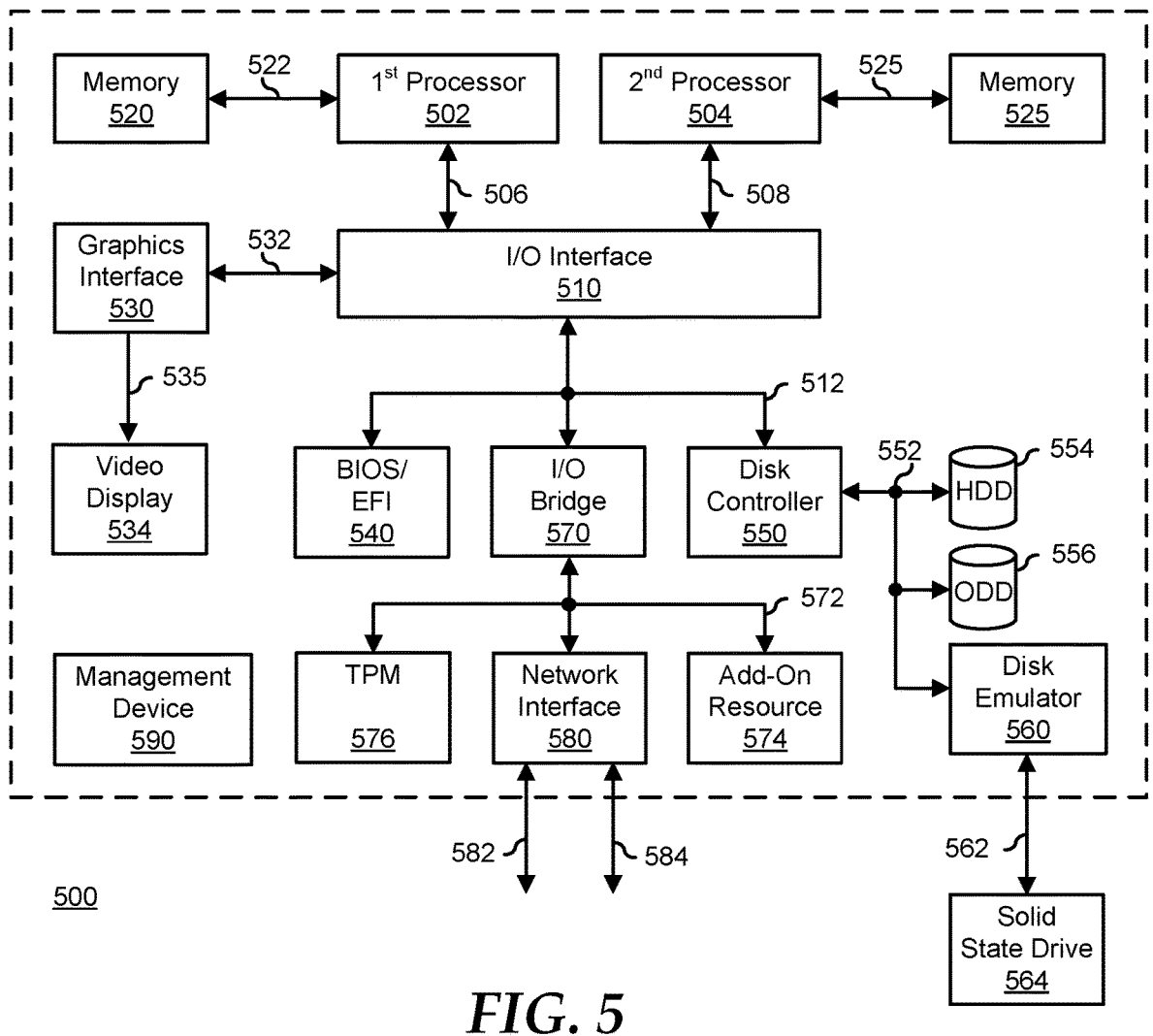
FIG. 5 is a block diagram illustrating a generalized information handling system according to another embodiment of the present disclosure.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, and a management device 590. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 535 to a video display 534. In a particular embodiment, information handling system 500 includes separate memories that are dedicated to each of processors 502 and 504 via separate memory interfaces. An example of memories 520 and 525 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a processor;
    a hardware network interface device coupled to the processor and configured to provide indications of faults on the network interface device to a network interface driver instantiated on the processor;
    a baseboard management controller agent instantiated on the processor and configured to set a trap on the network interface driver to receive the indications; and
    a baseboard management controller coupled to a management system, the baseboard management controller configured to operate out-of-band from the processor and to receive an identification of the management system from the management system, the management system configured to mitigate the faults on the network interface device;
    wherein:
        the network interface device is further configured to detect a first fault on the network interface device and to provide a first indication to the baseboard management controller agent in response to detecting the first fault; and
        the baseboard management controller agent is further configured to receive the first indication from the network interface device, to receive the identification of the management system from the baseboard management controller, and to provide a second indication to the management system based upon the identification.

2. The information handling system of claim 1, wherein, prior to receiving the identification, the baseboard management controller agent is further configured to provide a request to the baseboard management controller to send the identification.

3. The information handling system of claim 2, wherein the baseboard management controller agent receives the identification in response to the request.

4. The information handling system of claim 1, wherein the baseboard management controller agent receives the identification from the baseboard management controller prior to receiving the first indication.

5. The information handling system of claim 1, wherein the first fault includes a hardware fault on the network interface device.

6. The information handling system of claim 1, wherein the network interface device is configured to instantiate a virtual network port.

7. The information handling system of claim 6, wherein the first fault includes a fault on the virtual network port.

8. The information handling system of claim 1, wherein the second indication includes a Simple Network Management Protocol Data Unit.

9. The information handling system of claim 1, wherein the network interface device is further configured to provide the first indication to a network interface device driver, and the baseboard management controller agent is further configured to receive the first indication from the network interface device driver.

10. The information handling system of claim 1, wherein the management system mitigates the first fault in response to receiving the second indication.

11. A method, comprising:
    detecting, by a network interface device of an information handling system, a first fault on the network interface device;
    providing, by the network interface device, a first indication to a network interface driver instantiated on a processor of the information handling system in response to detecting the first fault;
    setting, by a baseboard management controller agent instantiated by the processor, a trap on the network interface driver to receive the first indication;
    receiving, by the baseboard management controller agent, the first indication in response to the trap;
    receiving, by a baseboard management controller of an information handling system, an identification of a management system coupled to the baseboard management controller, wherein the management system is configured to mitigate faults on the network interface device;
    receiving, by the baseboard management controller agent, the identification of the management system from a baseboard management controller; and
    providing, by the baseboard management controller agent, a second indication to the management system based upon the identification in response to receiving the first indication.

12. The method of claim 11, wherein prior to receiving the identification, the method further comprises:
    providing, by the baseboard management controller agent, a request to the baseboard management controller to send the identification.

13. The method of claim 12, wherein the baseboard management controller agent receives the identification in response to the request.

14. The method of claim 11, further comprising:
receiving, by the baseboard management controller agent, the identification from the baseboard management controller prior to receiving the first indication.

15. The method of claim 11, wherein the first fault includes a hardware fault on the network interface device.

16. The method of claim 11, further comprising instantiating, by the network interface device, a virtual network port.

17. The method of claim 16, wherein the first fault includes a fault on the virtual network port.

18. The method of claim 11, wherein the second indication includes a Simple Network Management Protocol Data Unit.

19. The method of claim 11, further comprising:
providing, by the network interface device, the first indication to a network interface device driver; and
receiving, by the baseboard management controller agent, the first indication from the network interface device driver.

20. An information handling system, comprising:
a hardware network interface device coupled to a processor and configured to provide indications of faults on the network interface device to a network interface driver instantiated on the processor;
a baseboard management controller agent instantiated on the processor and configured to set a trap on the network interface driver to receive the indications;
a management system configured to mitigate faults on the network interface device; and
a baseboard management controller coupled to the management system;
wherein:
the network interface device is further configured to detect a first fault on the network interface device, and to provide a first indication to the baseboard management controller agent in response to detecting the first fault;
the baseboard management controller agent is further configured to receive the first indication from the network interface device, and to provide a second indication to the baseboard management controller in response to receiving the first indication; and
the baseboard management controller is further configured to send a Simple Network Management Protocol Data Unit to the management system in response to receiving the second indication.

* * * * *